Jan. 23, 1940.  V. BEECHER  2,188,216
FAUCET
Filed Feb. 4, 1938
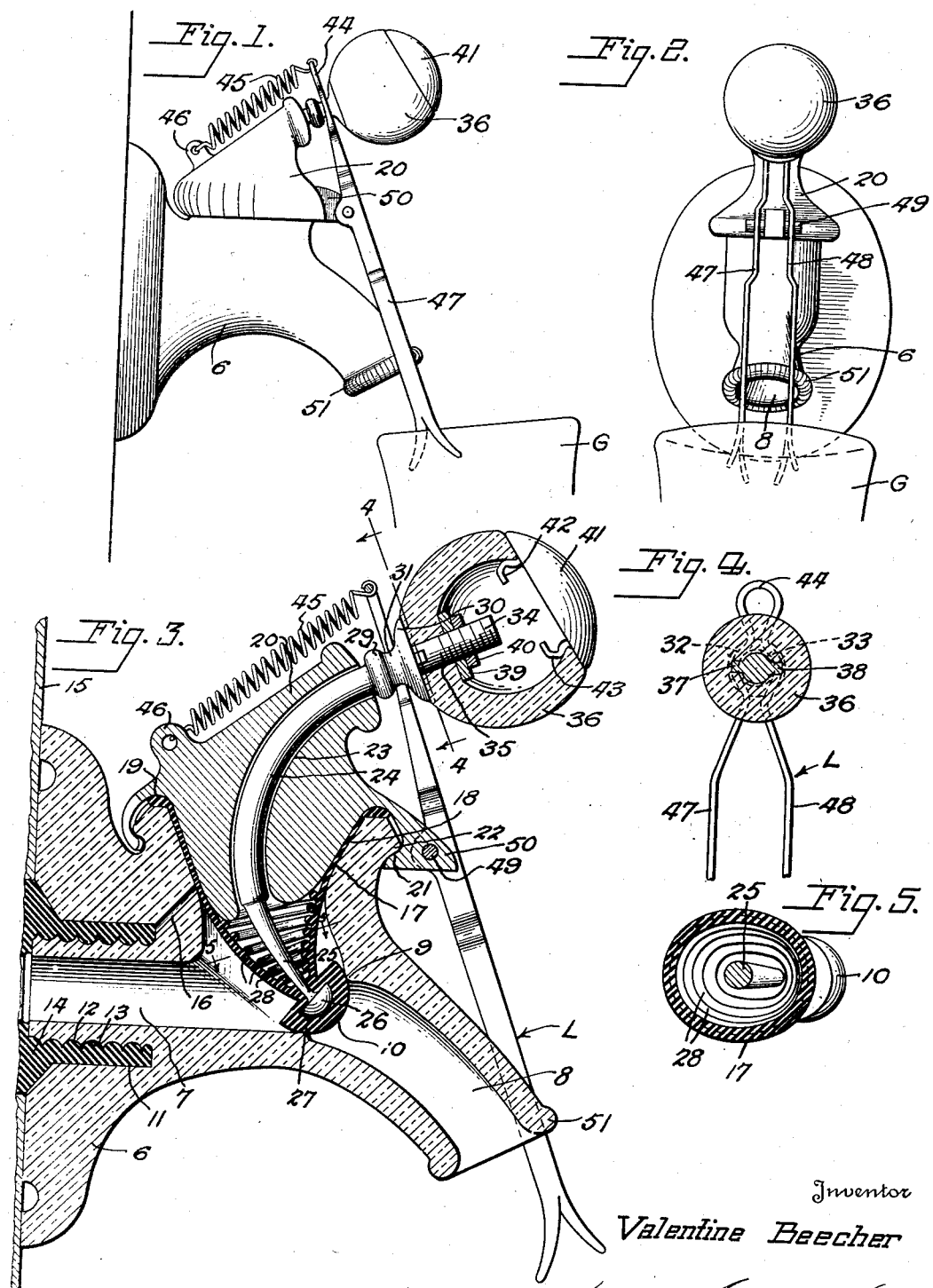
Inventor
Valentine Beecher
By Mason Fenwick & Lawrence
Attorneys Patented Jan. 23, 1940

2,188,216

UNITED STATES PATENT OFFICE 2,188,216

FAUCET

Valentine Beecher, Greenville, N. Y.

Application February 4, 1938, Serial No. 188,767

5 Claims. (Cl. 251—24)

This invention relates to faucets generally; and more particularly to faucets adapted to control the dispensing of beverages such as beer, milk, etc.

The main object of the invention is to provide a faucet, the body of which can be constructed of non-metallic material, with the flow of liquid therethrough controlled in such manner as to eliminate any chemical action between the operating elements of the faucet and the liquids dispensed therethrough.

Another object of the invention is to provide a faucet having parts which can be readily separated for replacement or repair and having the passages relatively arranged to facilitate cleansing thereof.

Other objects of the invention will become apparent as the detailed description thereof proceeds.

In the drawing:

Figure 1 is a fragmentary side elevation of a faucet constructed in accordance with the present invention;

Figure 2 is an end elevation of the faucet illustrated in Figure 1;

Figure 3 is a central vertical section, to an enlarged scale, of the aforesaid faucet;

Figure 4 is a section taken on the line 4—4 of Figure 3; and

Figure 5 is a section taken on the line 5—5 of Figure 3.

As shown in the drawing, the faucet comprises a body 6 of such shape and design as to permit the use of metal, glass or other non-corrosive material for its composition and having an inlet passage 7 divided from an outlet passage 8 by an annular flange 9 forming a seat for a hemispherical valve 10. The body 6 is provided with an annular groove 11 coaxial with the passage 7 and having the inner surface 12 screwthreaded to receive the internal screw threads 13 of an annular fitting 14, preferably of hard rubber suitably secured to the head 15 of a container from which liquid is to be dispensed. The body 6 is provided with a bore 16 forming a vent communicating at one end with the groove 11 to permit the escape of air while the faucet body 6 is being screwed onto the fitting 14.

The valve 10 is preferably formed of soft, white rubber on the apex of a substantially conical bag 17, the upper part of which conforms in contour with and is seated in a seat 18 formed in the upper part, or head, of the body 6. A flange 19 formed on the wide base of the bag 17 is seated on the upper end of the faucet body 6 and is clamped in seated position by means of the metallic cap 20. The cap 20 is formed with an inwardly directed flange 21 adapted to seat under an annular flange 22 extending outwardly from the head of the faucet body 6. The cap 20 has the flanged portion thereof slotted at its rear end to enable the said cap to be snapped onto the head of the faucet and to clamp the flange 19 in position on the aforesaid head.

The cap 20 is provided with an arcuate passage 23 which slidably receives and guides the valve stem 24. The cap 20 terminates a short distance above the inlet passage 7, and the stem 24 has a tapering extension 25 extending substantially axially through the conical rubber bag 17, and is provided at its lower end with a hemispherical head 26 which seats in a correspondingly shaped recess 27 formed in the rubber valve plug 10. A shown in Figure 3 of the drawing, the chamber defined by the bag 17 is provided with a series of annular ribs 28 which stiffen the bag and prevent its inward collapse when the stem 24 is operated to draw the valve 10 off its seat 9, and guides itself into a state of equal compression wherein it exerts a self closing force, returning valve plug 10 to its corresponding seat 27 in closed position when the knob 36 is released.

The upper end of the stem 24 is shaped to form a pair of annular flanges 29 and 30 separated by a recess 31 adapted to receive the oppositely curved branches 32 and 33 of a valve operating lever L. The stem 24 is continued beyond the flange 31 to form an externally screw-threaded rod 34 which passes radially through an aperture 35 formed in a hollow segmental spherical knob 36. Keys 37 and 38 extend from opposite sides of the rod 34 and seat in recesses correspondingly formed in the knob 36 to prevent rotation of that knob with respect to the flange 30. Lock nuts 39 and 40 engage the rod 34 to clamp the knob 36 securely against the flange 30. A spherical closure segment 41, provided with snap springs 42 and 43, closes the opening in the knob 36 and controls access to the nuts 39 and 40 which secure the knob 36 to the stem 24.

The valve operating lever L is shaped as a yoke including the branches 32 and 33 and a central eyelet portion 44 adapted to receive one end of a tension spring 45, the other end of which is detachably connected to an apertured lug 46 formed on the cap 20 at the rear end thereof. The lever L includes a pair of arms 47 and 48 continuing the branches 32 and 33, respectively. These arms are apertured to receive the opposite ends of a pivot pin 49 projecting laterally from an extension 50 formed on the cap 20 and continue below the lower end of the outlet passage 8, and are forked at their lower ends to receive the edge of a glass G.

The arms of the lever L are made of resilient material so that when the lever is forced inwardly against the finely serrated rim 51 of the faucet, the arms will contact with the sides of the rim and will spread apart as they are forced inwardly against the tension of the spring 45. When the arms of the lever L pass beyond the center of the outlet passageway, they will be held by friction in that position. In the latter position, it will be obvious that the valve 10 will be held continuously off its seat. Obviously, too, the operator may at any time lock the valve frictionally in open position merely by forcing the lower end of the lever L past the center of the faucet rim. Obviously, the rate of flow of liquid through the faucet may be determined by the position to which the lever arms 47 and 48 are adjusted on the rim 51 of the faucet. It is obvious that lever arms 47 and 48 and spring 45 are detachable elements which permit the opening and closing of the faucet and filling a glass or receptacle by a series of motions requiring the use of only one hand of the operator. Without these elements, the faucet may be operated by manual control of the knob 36.

The parts of the faucet are designed so that when the stem 24 is fully withdrawn in the bore 23, the valve 10 will be completely removed from any position which might obstruct the flow of liquid through the inlet and outlet passages 7 and 8. The said passages 7 and 8 are so arranged in the body portion 6 that both passages can be readily cleansed by passing a bristled brush throughout their entire length. The flange 9 offers such slight obstruction to the flow of liquid as to be negligible, thereby avoiding agitation and the use of increased pressure to force the liquid through the faucet, which is a matter of considerable importance to the proper dispensing of liquid such as beer and the like.

The rubber bag with the spherical valve at the end thereof enables the parts of the faucet to be readily disassembled by snapping the movable parts from the body of the faucet, and permits the insertion of a clean, sterilized bag in place of a used bag whenever it is found necessary to do so.

The rubber valve construction eliminates the necessity of using packing glands, springs, washers and lockcaps to prevent leakage; and it also eliminates the tendency to gum up the operating parts of the faucet through seepage of the liquid toward these operating parts. The general design of this faucet renders the use of screw-drivers, wrenches or pliers unnecessary in removing, adjusting or assembling the several parts of a faucet.

While I have shown this invention as embodied in a particular form, it is to be understood that it is not to be considered as limited to that form or in any other manner except as indicated by the scope of the claims appended hereto.

What I claim is:

1. A faucet comprising a body adapted to be connected to a liquid container and having a passageway provided with a valve seat, a conical bag of elastic material having a hemi-spherical valve secured in its apex end, a cap clamping the base of said bag to said body and separated from said passageway by said bag, a stem mounted to slide in said cap and connected at one end to the hemi-spherical valve, yielding means connected to said stem to hold the bag under tension with the valve thereof holding said apex end in closing position on said seat, and means pivoted to said cap and cooperating with said body for holding said stem in adjusted position in said cap.

2. A faucet comprising a body adapted to be connected to a liquid container and having a passageway provided with a valve seat, a conical bag of elastic material having a hemi-spherical valve at its apex, a cap clamping the base of said bag to said body and separated from said passageway by said bag, a stem mounted to slide in said cap and connected at one end to the hemi-spherical valve, and yielding means connected to said stem to hold the bag under tension with the valve thereof in seated position, a lever pivoted between its ends on said cap and having one arm thereof operably engaging said stem, yielding means connected at one end to the free end of said arm and at its other end to said cap for holding the stem in position to close said valve, the other arm of said lever being adapted to engage said body frictionally to hold said stem in any desired position of adjustment against the tension of said yielding means.

3. A faucet comprising a body adapted to be connected to a liquid container and having a passageway provided with a valve seat, a conical bag of elastic material having a hemi-spherical valve at its apex, a cap clamping the base of said bag to said body and separated from said passageway by said bag, a stem slidable in said cap and connected at one end to said valve and having an annular recess near the other end thereof, a yoke-lever pivoted between its ends to said cap and having one arm seated in said recess, a tension spring connected at one end to said cap and at its other end to said arm to hold the stem yieldingly in said cap and thereby maintain the valve normally in closed position on its seat, the other arm of said lever being movable into frictional engagement with said body to hold the stem in any desired position of adjustment in said cap.

4. A faucet comprising a body adapted to be connected to a liquid container and having a passageway therethrough provided with a valve seat, said body being provided with an annular flange, a conical bag of elastic material having a hemi-spherical valve at its apex and having an outwardly directed flange at its base, a cap snapped over said annular flange to clamp said flanges together, a stem slidable in said cap and connected at one end to said valve and having an annular recess near the other end thereof, a bifurcated lever pivoted to said cap and having its legs seated in said recess, means for yieldingly connecting one end of said lever to said cap, the other end of said lever being adapted to swing into frictional contact with the outlet end of said body to hold said stem and the valve connected thereto in any desired position of adjustment.

5. A faucet comprising a body adapted to be connected to a liquid container and having a passageway therethrough provided with a valve seat, said body being provided with an annular flange, a conical bag of elastic material having a hemi-spherical valve at its apex and having an outwardly directed flange at its base, a cap snapped over said annular flange to clamp said flanges together, a stem slidable in said cap and connected at one end to said valve and having an annular recess near the other end thereof, a bifurcated lever pivoted to said cap and having its legs seated in said recess, means for yieldingly connecting one end of said lever to said cap, the other end of said lever being adapted to swing into frictional contact with the outlet end of said body to hold said stem and the valve connected thereto in any desired position of adjustment, the lower ends of said lever being bifurcated to receive the rim of a receptacle.

VALENTINE BEECHER.